(12) United States Patent
Kim

(10) Patent No.: US 11,302,910 B2
(45) Date of Patent: Apr. 12, 2022

(54) LITHIUM SECONDARY BATTERY NEGATIVE ELECTRODE INCLUDING PROTECTION LAYER MADE OF CONDUCTIVE FABRIC, AND LITHIUM SECONDARY BATTERY INCLUDING SAME

(71) Applicant: LG CHEM, LTD., Seoul (KR)

(72) Inventor: Yeeun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 276 days.

(21) Appl. No.: 16/328,625

(22) PCT Filed: Sep. 27, 2017

(86) PCT No.: PCT/KR2017/010716
§ 371 (c)(1),
(2) Date: Feb. 26, 2019

(87) PCT Pub. No.: WO2018/062844
PCT Pub. Date: Apr. 5, 2018

(65) Prior Publication Data
US 2020/0235385 A1 Jul. 23, 2020

(30) Foreign Application Priority Data

Sep. 30, 2016 (KR) .......... 10-2016-0126910
Sep. 26, 2017 (KR) .......... 10-2017-0124054

(51) Int. Cl.
*H01M 4/36* (2006.01)
*H01M 4/134* (2010.01)
(Continued)

(52) U.S. Cl.
CPC .......... *H01M 4/366* (2013.01); *H01M 4/134* (2013.01); *H01M 4/663* (2013.01); *H01M 4/806* (2013.01);
(Continued)

(58) Field of Classification Search
CPC ...... H01M 4/366; H01M 4/134; H01M 4/663; H01M 4/806; H01M 50/46;
(Continued)

(56) References Cited

U.S. PATENT DOCUMENTS

| 4,749,451 A | 6/1988 | Naarmann |
| 2006/0159998 A1 | 7/2006 | Harada et al. |

(Continued)

FOREIGN PATENT DOCUMENTS

| CN | 101960651 A | 1/2011 |
| CN | 102142532 A | 8/2011 |

(Continued)

OTHER PUBLICATIONS

International Search Report (PCT/ISA/210) issued in PCT/KR2017/010716, dated Jul. 25, 2018.
(Continued)

*Primary Examiner* — Stephen J Yanchuk
(74) *Attorney, Agent, or Firm* — Birch, Stewart, Kolasch & Birch, LLP

(57) ABSTRACT

A negative electrode for a lithium secondary battery including a protective layer formed with a conductive fabric, in particular, to a negative electrode for a lithium secondary battery including a conductive fabric formed on at least one surface of the lithium metal layer and having pores, and a lithium secondary battery including the same. The lithium secondary battery including a negative electrode having the conductive fabric as a protective layer that induces uniform reactions within the pores, thus preventing local lithium metal formation on the lithium metal surface, and thereby suppressing dendrite formation on the lithium metal surface, and thereby suppressing dendrite formation and cell volume expansion. In addition thereto, mechanical stability can be maintained even when lithium plating and stripping occurs (Continued)

\<SIDE SURFACE\>   \<CROSS SECTION\> due to the flexibility and tension/contraction of the conductive fabric.

11 Claims, 5 Drawing Sheets

(51) Int. Cl.
| | |
|---|---|
| *H01M 4/66* | (2006.01) |
| *H01M 4/80* | (2006.01) |
| *H01M 10/0525* | (2010.01) |
| *H01M 50/46* | (2021.01) |
| *H01M 4/02* | (2006.01) |

(52) U.S. Cl.
CPC ....... *H01M 10/0525* (2013.01); *H01M 50/46* (2021.01); *H01M 2004/021* (2013.01); *H01M 2004/027* (2013.01); *H01M 2004/028* (2013.01)

(58) Field of Classification Search
CPC ..... H01M 2004/021; H01M 2004/027; H01M 2004/028; H01M 10/0525
See application file for complete search history.

(56) References Cited

U.S. PATENT DOCUMENTS

| | | |
|---|---|---|
| 2009/0246626 A1 | 10/2009 | Tasaki et al. |
| 2011/0177388 A1 | 7/2011 | Bae et al. |
| 2013/0316236 A1 | 11/2013 | Hackenberg et al. |
| 2014/0186716 A1 | 7/2014 | Wu et al. |
| 2015/0295246 A1 | 10/2015 | Son et al. |
| 2015/0318552 A1 | 11/2015 | Skotheim et al. |
| 2016/0020462 A1 | 1/2016 | Yang |
| 2016/0056501 A1 | 2/2016 | Ryu et al. |
| 2016/0111730 A1 | 4/2016 | Kim et al. |
| 2016/0293943 A1* | 10/2016 | Hu .................... H01M 10/0525 |
| 2016/0344035 A1* | 11/2016 | Zhamu ................. H01M 12/08 |
| 2017/0331027 A1 | 11/2017 | Kim et al. |
| 2018/0040874 A1* | 2/2018 | Zhamu .................. H01G 11/84 |

FOREIGN PATENT DOCUMENTS

| | | |
|---|---|---|
| CN | 103222093 A | 7/2013 |
| CN | 103915604 A | 7/2014 |
| CN | 104466191 A | 3/2015 |
| CN | 105074968 A | 11/2015 |
| CN | 105765759 A | 7/2016 |
| CN | 105792394 A | 7/2016 |
| EP | 0 834 941 A1 | 4/1998 |
| EP | 2830126 A1 | 1/2015 |
| EP | 3043402 A1 | 7/2016 |
| JP | 63-150867 A | 6/1988 |
| JP | 2004-22332 A | 1/2004 |
| JP | 2007-173615 A | 7/2007 |
| JP | 2010-86737 A | 4/2010 |
| JP | 4914059 B2 | 4/2012 |
| JP | 2016-29653 A | 3/2016 |
| KR | 1998-024955 A | 7/1998 |
| KR | 1999-0055229 A | 7/1999 |
| KR | 10-2013-0123142 A | 11/2013 |
| KR | 10-2014-0128528 A | 11/2014 |
| KR | 10-1477782 B1 | 12/2014 |
| KR | 10-2015-0030156 A | 3/2015 |
| KR | 10-1551472 B1 | 9/2015 |
| KR | 10-2016-0033988 A | 3/2016 |
| KR | 10-2016-0034183 A | 3/2016 |
| KR | 10-1622354 B1 | 5/2016 |
| KR | 10-2016-0066298 A | 6/2016 |
| KR | 10-1632797 B1 | 6/2016 |
| WO | WO 01/39303 A1 | 5/2001 |
| WO | WO 2007/111895 A2 | 10/2007 |

OTHER PUBLICATIONS

Lee et al., "Wearable Textile Battery Rechargeable by Solar Energy," Nano Lett. 2013, 13, pp. 5753-5761.
Extended European Search Report for European Application No. 17866730.1, dated Sep. 24, 2010.
Guo et al., "Construction of sandwiched graphene paper@Fe3O4 nanorod array@graphene for large and fast lithium storages with extended lifespan," Journal of Materials Chemistry A, vol. 3, 2015, pp. 19384-19392 (10 pages total).

* cited by examiner

[Figure 1]
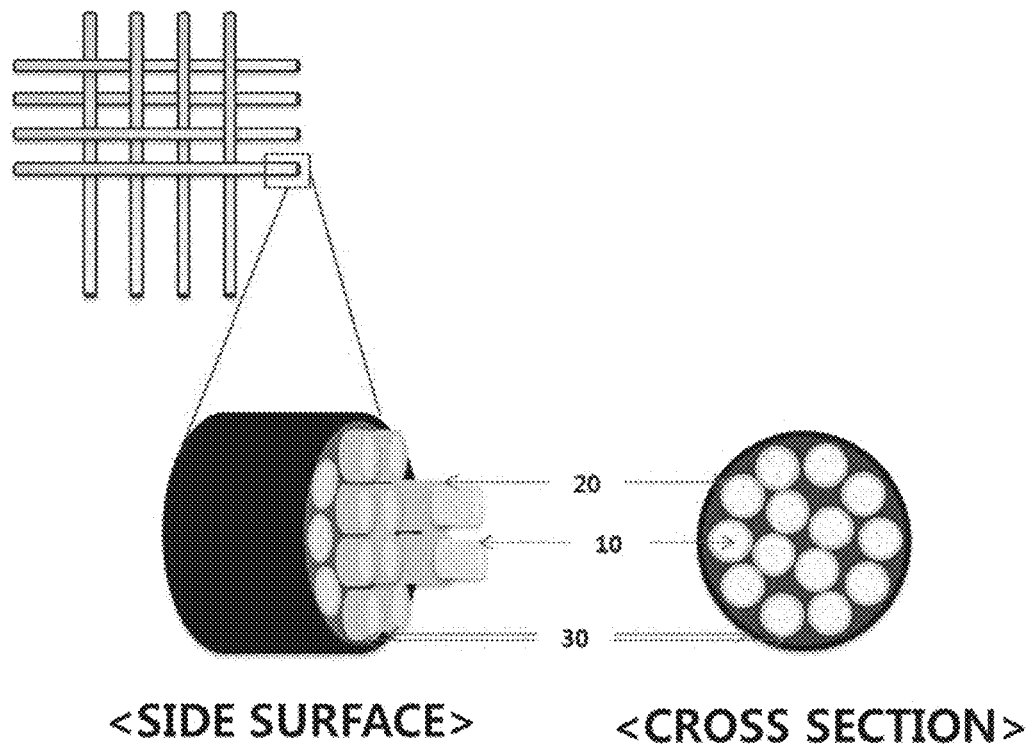
<SIDE SURFACE>　　<CROSS SECTION>
[Figure 2]
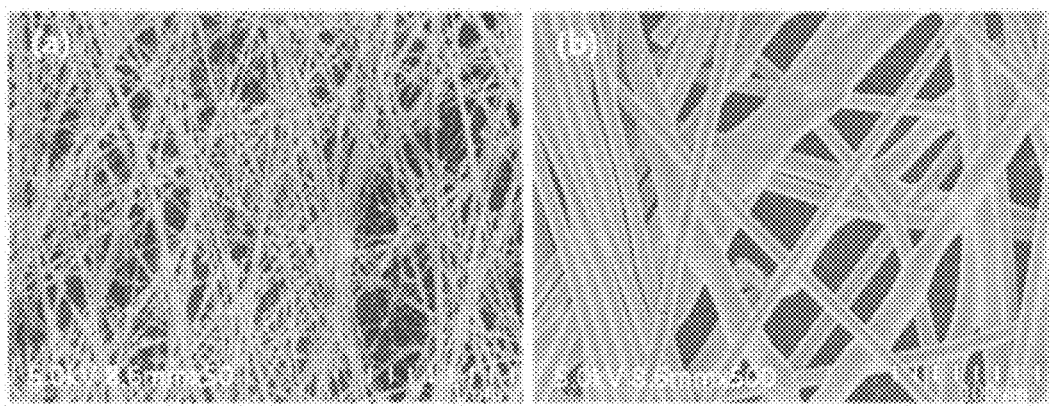

[Figure 3]
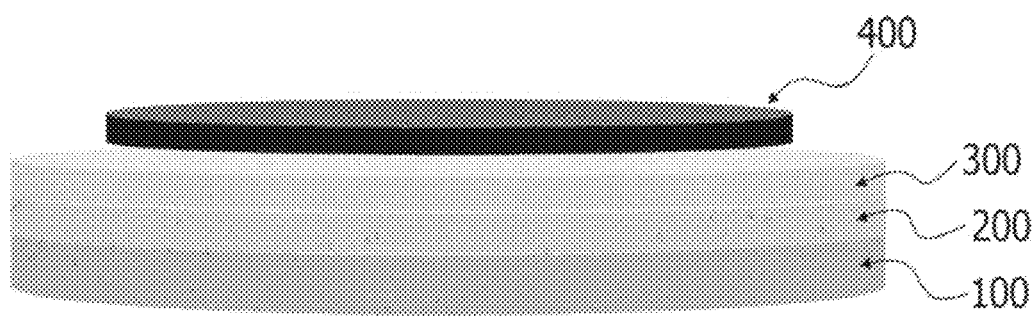
[Figure 4]
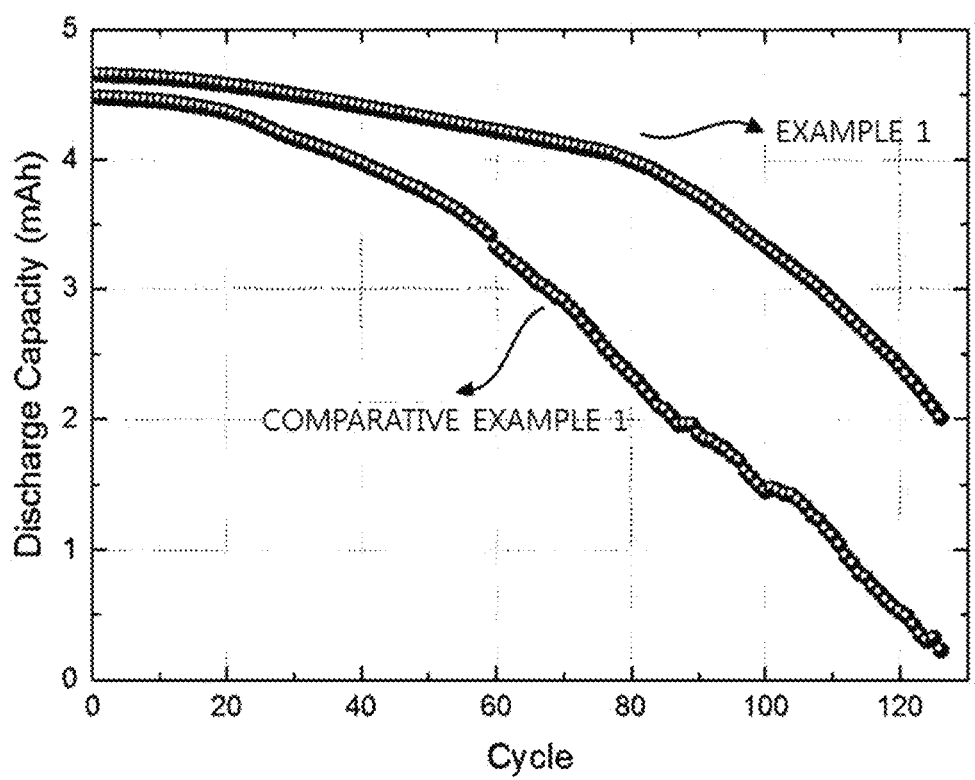

[Figure 5]
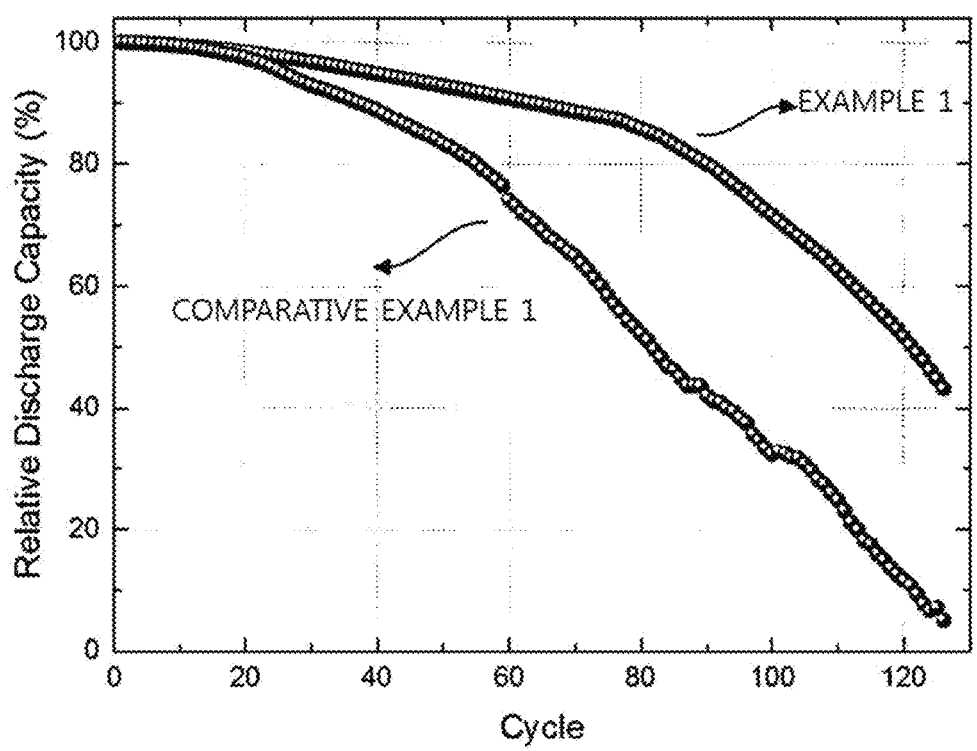

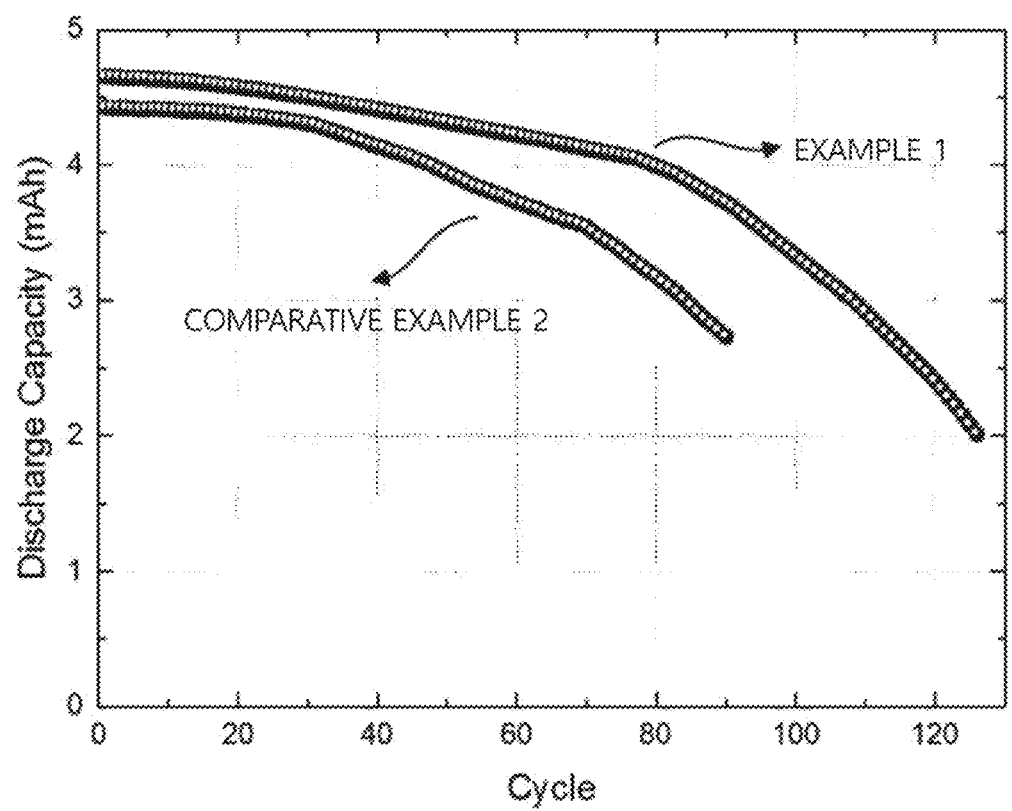
[Figure 6]

[Figure 7]
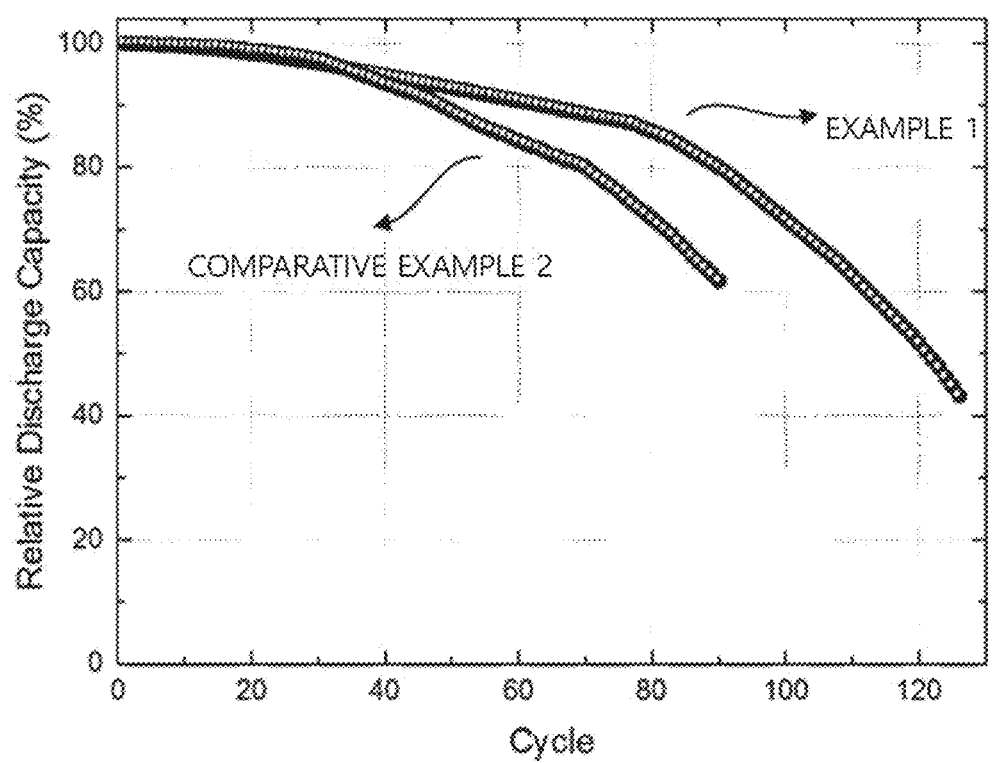

LITHIUM SECONDARY BATTERY NEGATIVE ELECTRODE INCLUDING PROTECTION LAYER MADE OF CONDUCTIVE FABRIC, AND LITHIUM SECONDARY BATTERY INCLUDING SAME

TECHNICAL FIELD

This application claims priority to and the benefits of Korean Patent Application No. 10-2016-0126910, filed with the Korean Intellectual Property Office on Sep. 30, 2016, and Korean Patent Application No. 10-2017-0124054, filed with the Korean Intellectual Property Office on Sep. 26, 2017, the entire contents of which are incorporated herein by reference.

The present invention relates to a negative electrode for a lithium secondary battery including a protective layer formed with a conductive fabric, and in particular, to a negative electrode for a lithium secondary battery including a conductive fabric formed on at least one surface of the lithium metal layer and having pores, and a lithium secondary battery including the same.

BACKGROUND ART

Interests in energy storage technologies have been increasingly higher recently. As applications have expanded to energy of mobile phones, camcorders and notebook PCs, and furthermore, to electric vehicles, efforts on the research and development of electrochemical devices have been more and more materialized.

Electrochemical devices are fields receiving most attention in such aspects and among these, development of secondary batteries capable of charge and discharge has been the focus of attention, and in developing such batteries, research and development on the design of new electrodes and batteries have been recently progressed for enhancing energy density and energy efficiency.

Among currently used secondary batteries, lithium secondary batteries developed in early 1990s have received attention with advantages of having high operating voltage and significantly higher energy density compared to conventional batteries such as Ni-MH, Ni—Cd and sulfuric acid-lead batteries using an aqueous liquid electrolyte.

A lithium secondary battery generally formed by embedding an electrode assembly including a positive electrode, a negative electrode and a separator between the positive electrode and the negative electrode into a battery case in a laminated or wound structure, and injecting a non-aqueous liquid electrolyte thereinto.

As a lithium electrode used as a negative electrode, lithium foil is attached on a planar current collector. In this case, lithium dendrite is formed due to irregular lithium plating and stripping while charge and discharge are progressed, which leads to a continuous capacity decrease.

In order to resolve such issues, studies such as introducing a polymer protective layer or an inorganic solid protective layer to a lithium metal layer, increasing concentration of a salt of a liquid electrolyte, or using proper additives have been currently progressed. However, effects of lithium dendrite suppression of such studies are insignificant. Accordingly, modifying a form of a lithium metal negative electrode itself or modifying the structure of a battery may become an effective alternative in resolving the problems.

PRIOR ART DOCUMENTS

Patent Documents

Korean Patent Application Laid-Open Publication No. 2015-0030156 "Lithium electrode and lithium secondary battery including the same"

DISCLOSURE

Technical Problem

As described above, lithium dendrite of a lithium secondary battery is precipitated on a negative electrode current collector surface and sometimes causes cell volume expansion therefrom. As a result of extensive studies in view of the above, the inventors of the present invention have found out a way to resolve such a problem caused by dendrite through modifying a form and a structure of an electrode itself, and have completed the present invention.

Accordingly, an aspect of the present invention provides a lithium secondary battery resolving a problem of cell volume expansion caused by lithium dendrite through modifying a faun and a structure of an electrode, and having enhanced performance.

Technical Solution

According to an aspect of the present invention, there is provided a negative electrode for a lithium secondary battery including a lithium metal layer; and a protective layer formed on at least one surface of the lithium metal layer, wherein the protective layer is a conductive fabric with pores formed therein.

According to another aspect of the present invention, there is provided a lithium secondary battery including the negative electrode.

Advantageous Effects

A lithium secondary battery including a negative electrode using a conductive fabric according to the present invention as a protective layer that induces uniform reactions within the pores, thus preventing local lithium metal formation on the lithium metal surface, and thereby suppressing dendrite formation and forming a uniform surface, and cell volume expansion can be suppressed therefrom. In addition thereto, mechanical stability can be maintained even when lithium plating and stripping occurs due to the flexibility and tension/contraction of the conductive fabric.

DESCRIPTION OF DRAWINGS

FIG. 1 is a mimetic diagram of a conductive fabric according to the present invention.

FIG. 2 is a SEM image of a conductive fabric according to the present invention.

FIG. 3 is a mimetic diagram of a lithium secondary battery using a conductive fabric according to the present invention as a protective layer.

FIG. 4 is a discharge capacity graph of Example 1 and Comparative Example 1 of the present invention.

FIG. 5 is a relative discharge capacity graph of Example 1 and Comparative Example 1 of the present invention.

FIG. 6 is a discharge capacity graph of Example 1 and Comparative Example 2 of the present invention.

FIG. 7 is a relative discharge capacity graph of Example 1 and Comparative Example 2 of the present invention.

BEST MODE

Hereinafter, the present invention will be described in detail with reference to accompanying drawings so that those skilled in the art may readily implement the present invention. However, the present invention may be implemented in various different forms, and is not limited to the present specification.

The present invention provides a negative electrode for a lithium secondary battery including a lithium metal layer; and a protective layer formed on at least one surface of the lithium metal layer, wherein the protective layer includes a conductive fabric with pores formed therein.

Common protective layers protecting lithium metal suppress an electrochemical reaction to resolve a lithium dendrite problem, however, the present invention introduces a conductive protective layer to increase electrochemical reactivity, and thereby enhancing the electrochemical performance, and also suppresses local lithium dendrite formation on a lithium metal layer surface since lithium plating and stripping occurs in the pores formed by crossing of the warp and the weft of the conductive fabric. Such a fabric form is preferred as a protective layer due to reasons such as controlling a thickness, securing certain pores and maintaining a stable form.

The conductive fabric of the present invention has flexibility and tension/contraction due to fabric properties, and therefore, when used as a protective layer of a lithium electrode, is capable of maintaining mechanical stability even under lithium dendrite formation.

In order to maximize such effects, a pore size of the conductive fabric is formed to tens to millions of nano-sizes, and preferably, is from 1 µm to 10,000 µm and more preferably from 10 µm to 3,000 µm.

Porosity, the percentage of the pores in the conductive fabric, is preferably from 5% to 50% as a percentage of the area occupied by the pore region based on 100% of the whole protective layer area. When the porosity is less than 5%, the effect of suppressing lithium dendrite formation, a goal of the present invention, may not be secured, and when the porosity is greater than 50%, an area of contact between the protective layer and the lithium metal layer relatively decreases declining battery performance.

The conductive fabric being thinner is advantageous for a battery performance, however, lithium dendrite formation may be suppressed when the conductive fabric is formed to a certain thickness or higher. Considering the significance of improving effects obtained by such protective layer formation, the thickness is preferably from 0.01 µm to 50 µm.

Having conductivity as a protective layer of a lithium electrode may enhance battery performance by facilitating electrochemical reactions, and therefore, the conductive fabric preferably has a sheet resistance of 0.001 ohmn/sq to ohmn/sq. When the sheet resistance is greater than 1 ohmn/sq, an effect of enhancing an battery performance through conductivity, a goal of the present invention, is difficult to secure, and when the fabric has sheet resistance of less than 0.001 ohmn/sq, ions and products do not readily migrate due to quick polarization by electrochemical reactants and products, which declines battery performance.

Preferably, as shown in FIG. 1, threads (10) form the warp and the weft by forming a plurality of assembled bundles in the conductive fabric, and are weaved to a base fabric. An outer surface of the thread of the base fabric may be coated with a metal material (20), and an outer surface of the metal material may be coated with a carbon material (30).

As the thread, one or more types are selected from the group consisting of polyester, polyamide, polyethylene, polyurethane, polypropylene, polyurea, cotton, wool, silk and linen, and are weaved to a base fabric.

As the metal material uniformly coated on the weaved base fabric, one or more types selected from the group consisting of nickel (Ni), copper (Cu), aluminum (Al), gold (Au), silver (Ag), zinc (Zn) and tin (Sn) are preferred in providing conductivity as a protective layer, a goal of the present invention.

Herein, the metal material may be coated in 30 parts by weight to 70 parts by weight and preferably in 40 parts by weight to 60 parts by weight with respect to 100 parts by weight of the base fabric. When the metal material is coated in less than 30 parts by weight, providing conductivity to the fabric is insufficient, and effects that the present invention aims to obtain are difficult to secure, and when the metal material is coated in greater than 70 parts by weight, flexibility and tension/contraction, properties of the fabric itself, decrease.

The carbon material coated on an outer surface of the metal material may suppress non-uniform lamination of lithium dendrite, and enables a stable solid electrolyte interphase (SEI) layer to form locally in the pore by inducing a lithium dendrite reaction inside the pores. In addition, the carbon material performs a role as a binder of the threads coated with the metal material and thereby enhances adhesive strength of each of the threads. Such a carbon material is preferred as a protective layer that needs to be stable and have proper rigidity.

As the carbon material coated on an outer surface of the metal material, one or more types may be selected from the group consisting of graphite-based such as natural graphite, artificial graphite, expanded graphite, graphene, Super-P or Super-C; active carbon-based; carbon black-based such as denka black, ketjen black, channel black, furnace black, thermal black, contact black, lamp black or acetylene black; carbon nanostructures such as carbon fiber-based, carbon nanotubes (CNT) or fullerene; and combinations thereof.

Herein, the carbon material is coated in 20 parts by weight to 50 parts by weight and preferably in 30 parts by weight to 40 parts by weight with respect to 100 parts by weight of the base fabric. When the carbon material is coated in less than 20 parts by weight, the metal material is exposed outside leading to a problem of forming lithium dendrite on the metal material, and the carbon material being coated in greater than 50 parts by weight is not preferred since it may cause concern of blocking the pores formed in the fabric.

The method for preparing the conductive fabric described above is not particularly limited in the present invention, but may include (S1) preparing a thread-weaved base fabric; (S2) coating a metal material on the base fabric; and (S3) coating a carbon material on the metal material.

Hereinafter, each step will be described.

(S1) Preparing a Thread-Weaved Base Fabric

First, a fabric having the material and the pore properties described above is prepared or purchased. Herein, the preparation is carried out through a common spinning process, and is not particularly limited in the present invention.

(S2) Coating a Metal Material on the Base Fabric

Next, a metal is coated on the base fabric through a dry coating or wet coating process. Dry coating of the metal may be carried out using a PVD method such as sputtering, vacuum deposition or ion plating, or using an electro or electroless plating method. Such a method is not particularly limited in the present invention, and known methods may be used. When coating the metal through the electroless plating method, an electroless plating solution including pure water, a metal salt, a chelating agent, a reducing agent, a stabilizer and a pH modifier is prepared, and then the base fabric is immersed thereinto.

(S3) Coating a Carbon Material on the Metal Material

Next, the metal material-coated base fabric is coated using a carbon material. As the carbon material, materials described above may be used, and a wet process referred to as slurry coating is used. Herein, the slurry coating is carried out by preparing a slurry coating solution including the carbon material, a binder, a solvent and a dispersant, coating the slurry coating solution on the metal material of the base fabric using various methods such as print coating, dip coating, roll coating, spin coating, flow coating or gravure coating, and then drying the result.

As shown in FIG. 1, the conductive fabric prepared using the above-mentioned preparation method has a form in which a surface of each of the threads (10) forming the warp and the weft of the fabric is coated with a metal material (20), and a surface of or space between the threads is continuously coated or filled with a carbon material (30). The electroless plating method used in the present invention may preserve the original form of the thread. Accordingly, metal material coating based on the electroless plating method accomplishes a double function, that is, functions of providing metal conductivity and maintaining mechanical properties of the fabric itself.

As one example, a polyester fabric is immersed in 37% HCl (pH=1) containing 26 mM $SnCl_2$ for 10 minutes at 25° C. Then, in order to activate the sample, the polyester fabric is immersed in 1.7 mM $PdCl_2$, 37% HCl and 0.32 M $H_3BO_3$ at pH 2. Next, for depositing nickel (Ni) through electroless plating, the fabric sample is immersed in 97 mM $NiSO_4$, 27 mM trisodium citrate dihydrate, 0.34 M $NH_4Cl$ and 0.14 M $NaPO_2H_2.H_2O$. Lastly, the nickel-plated fabric is washed with deionized water and dried for 20 minutes at 150° C.

In order to coat a carbon material on the prepared nickel (Ni)-coated polyester fabric, slurry is prepared by dissolving denka black and a polyurethane (PU) binder in N-methyl-2-pyrrolidinone in a weight ratio of 9:1. The slurry prepared as above is casted on the Ni-coated polyester fabric using a doctor blade technology. When the carbon layer is casted, the sample is dried in a vacuum oven at 80° C. for 12 hours. A form of the denka black being laminated on the electroless-plated nickel (Ni) described above is obtained.

In the negative electrode for a lithium secondary battery provided in the present invention, a negative electrode current collector may be additionally formed on the other side of the lithium metal layer (surface with no protective layer formation). The negative electrode current collector is not particularly limited as long as it has high conductivity without inducing chemical changes to a battery, and examples thereof may include any one metal selected from the group consisting of copper, aluminum, stainless steel, zinc, titanium, silver, palladium, nickel, iron, chromium, alloys thereof and combinations thereof. The stainless steel may have its surface treated with carbon, nickel, titanium or silver, and aluminum-cadmium alloys may be used as the alloy, and in addition thereto, baked carbon, nonconductive polymers of which surface is treated with a conductor, conductive polymers or the like may also be used. A copper thin plate is generally used as the negative electrode current collector.

As the negative electrode current collector, those generally having a thickness range of 3 μm to 500 μm are used. When the negative electrode current collector has a thickness of less than 3 μm, a current collecting effect decreases, and the thickness being greater than 500 μm has a problem of processibility decline when assembling a cell through folding.

As shown in FIG. 3, the present invention provides a lithium secondary battery including a negative electrode (100); a positive electrode (400); a separator (300) and an electrolyte (not shown) provided therebetween, wherein the negative electrode uses the conductive fabric described above as a protective layer (200). Herein, the protective layer (200) may be used on both surfaces or one surface of the negative electrode (100), and is preferably disposed on one surface adjoining the electrolyte.

In the lithium secondary battery according to the present invention, constitutions other than structures and characteristics of the negative electrode described above may be prepared through known technologies implemented by those skilled in the art, and hereinafter, specific descriptions will be provided.

The positive electrode according to the present invention may be prepared into a positive electrode form by filming a composition including a positive electrode active material, a conductor and a binder on a positive electrode current collector.

As the positive electrode active material, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}CoyO_2$, $LiCo_{1-y}MnyO_2$, $LiNi_{1-y}MnyO_2$ ($0 \le y<1$), $Li(Ni_aCo_bMn_c)O_4$ ($0<a<2$, $0<b<2$, $0<c<2$, $a+b+c=2$), $LiMn_{2-z}NizO_4$, $LiMn_{2-z}CozO_4$ ($0<z<2$), $LiCoPO_4$ and $LiFePO_4$, or a mixture of two or more types thereof may be used. In addition, sulfides, selenides, halides and the like may also be used in addition to such oxides. In more preferred examples, the positive electrode active material may be $LiCoO_2$ suited for high battery performance.

The conductor is a component for further enhancing conductivity of a positive electrode active material, and nonlimiting examples thereof may include graphite such as natural graphite or artificial graphite; carbon black such as carbon black, acetylene black, ketjen black, channel black, furnace black, lamp black and thermal black; conductive polymers such as carbon fibers or metal fibers; fluorocarbon, aluminum and metal powders such as nickel powder; conductive whiskers such as zinc oxide and potassium titanate; conductive metal oxides such as titanium oxide; conductive materials such as polyphenylene derivatives, and the like.

The binder has functions of keeping a positive electrode active material on a positive electrode current collector, and organically linking the positive electrode active materials, and examples thereof may include polyvinylidene fluoride (PVDF), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

The separator according to the present invention is not particularly limited in the material and, as a material physically separating a positive electrode and a negative electrode and having electrolyte and ion penetrability, those commonly used as a separator in an electrochemical device may be used without particular limit. However, as a material that is porous, nonconductive and insulating, those having an excellent liquid electrolyte moisture-containing ability while having low resistance for ion migration of the liquid electrolyte are particularly preferred. For example, a polyolefin-based porous membrane or a non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these may be used.

As the non-woven fabric other than the polyolefin-based non-woven fabric described above, a non-woven fabric formed with a polymer using, for example, polyphenylene oxide, polyimide, polyimide, polycarbonate, polyethylene terephthalate, polyethylene naphthalate, polybutylene terephthalate, polyphenylene sulfide, polyacetal, polyether sulfone, polyetheretherketone, polyester and the like alone, or formed with a polymer mixing these may be used, and, as a fiber form forming a porous web, such a non-woven fabric includes a spunbond or meltblown form formed with long fibers.

The thickness of the separator is not particularly limited, but is preferably in a range of 1 μm to 100 μm, and more preferably in a range of 5 μm to 50 μm. When the separator has a thickness of less than 1 μm, mechanical properties may not be maintained, and when the thickness is greater than 100 μm, the separator functions as a resistive layer declining battery performance.

A pore size and porosity of the separator are not particularly limited, however, the pore size is preferably from 0.1 μm to 50 μm, and the porosity is preferably from 10% to 95%. When the separator has a pore size of less than 0.1 μm or porosity of less than 10%, the separator functions as a resistive layer, and when the pore size is greater than 50 μm or the porosity is greater than 95%, mechanical properties may not be maintained.

The electrolyte capable of being used in the present invention may be a liquid non-aqueous electrolyte, or a polymer electrolyte such as a solid electrolyte or a gel electrolyte. In the former, the non-aqueous electrolyte battery is formed as a so-called lithium ion secondary battery, and in the latter, the non-aqueous electrolyte battery is formed as a polymer electrolyte battery such as a polymer solid electrolyte battery or a polymer gel electrolyte battery. When the solid electrolyte performs a function of the separator described above, a separate separator may not be included.

The electrolyte salt included in the non-aqueous liquid electrolyte is a lithium salt. As the lithium salt, those commonly used in liquid electrolytes for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

The concentration of the lithium salt included in the non-aqueous liquid electrolyte is preferably from 0.1 mol/L to 5 mol/L and more preferably from 0.5 mol/L to 3.0 mol/L.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone or as a mixture of two or more types.

As the ether among the organic solvents, any one selected from the group consisting of dimethyl ether, diethyl ether, dipropyl ether, methylethyl ether, methylpropyl ether, ethylpropyl ether, ethoxyethyl ether, diethylene glycol dibutyl ether, tetraethylene glycol dimethyl ether, polyethylene glycol dimethyl ether and dioxolane, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

Specific examples of the linear carbonate compound may typically include any one selected from the group consisting of dimethyl carbonate, diethyl carbonate, dipropyl carbonate, ethylmethyl carbonate, methylpropyl carbonate and ethylpropyl carbonate, or a mixture of two or more types thereof, but are not limited thereto.

Specific examples of the cyclic carbonate compound may include any one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate and the like, but are not limited thereto.

The non-aqueous liquid electrolyte may be injected at a proper stage in an electrochemical device manufacturing process depending on manufacturing process and required properties of a final product. In other words, the non-aqueous liquid electrolyte may be injected at a stage prior to assembling an electrochemical device or at a final stage of electrochemical device assembly.

The lithium secondary battery according to the present invention may go through lamination (stack) and folding processes of a separator and an electrode in addition to winding, a general process. In addition, the battery case may be a cylinder-type, a square-type, a pouch-type, a coin-type or the like.

As described above, the lithium secondary battery according to the present invention stably exhibits excellent cycle performance and electrochemical performance, and therefore, is useful in the fields of portable devices such as mobile phones, notebook computers or digital cameras, electric vehicles such as hybrid electric vehicles (HEV), and the like.

According to another embodiment of the present invention, there is provided a battery module including the lithium secondary battery as a unit cell, and a battery pack including the same. The battery module or the battery pack may be used as a power supply of any one or more medium to large-sized devices such as power tools; electric vehicles including electric vehicles (EV), hybrid electric vehicles (HEV) and plug-in hybrid electric vehicles (PHEV); or systems for power storage.

Hereinafter, the present invention will be described in detail with reference to examples in order to specifically describe the present invention. However, the examples according to the present invention may be modified to various different forms, and the scope of the present invention is not construed as being limited to the examples described below. The examples of the present invention are provided in order to more fully describe the present invention for those having average knowledge in the art.

Example 1

After preparing as in the following Table 1, a coin cell was assembled in order of body/cathode/separator/conductive fabric/anode/spacer/Ni foam/spring/cap. Herein, as the conductive fabric, a polyester thread was coated with nickel (Ni) as a metal material, and coated with a mixture mixing an active material (LCO), a conductor (CNT-based) and a binder (PVDF-based) as a carbon material, and the conductive fabric had sheet resistance of 0.08 ohmn/sq, a thickness of 32 μm to 35 μm, a pore size of 7 μm to 28 μm and porosity of approximately 15%.

TABLE 1

| Cathode | LiCoO$_2$, 20 um Al Foil |
| --- | --- |
| Separator | PE |
| Anode | 20 um Li metal, 10 um Cu Foil |
| Electrolyte | 80 uL, Carbonate-Based Liquid Electrolyte |

Comparative Example 1

A coin cell was assembled using the same constitutions as in Example 1 except the conductive fabric.

Comparative Example 2

A coin cell was assembled using the same constitutions as in Example 1 except a nonconductive fabric instead of the conductive fabric.

Herein, as the nonconductive fabric, a polyester thread was used, which had sheet resistance of 0.3 ohmn/sq, a thickness of 29 μm to 33 μm, a pore size of 10 μm to 25 μm and porosity of approximately 15%.

Experimental Example 1

The coin cell lithium secondary batteries of Example 1 and Comparative Examples 1 and 2 were charged and discharged under the following condition.
Formation: Charge 0.2 C/Discharge 0.2 C (3 times)
Cycle: Charge 0.3 C/Discharge 0.5 C (80 times or more)
Results
FIG. 4 and FIG. 6 show data with cycle as the x axis and discharge capacity as the y axis. As shown in FIG. 4, the electrochemical performance was enhanced when using the conductive protective layer of Example 1. This is due to the fact that initial discharge capacity appears to be larger compared to Comparative Example 1 when using the conductive fabric.

In addition, as shown in FIG. 6, it was seen that the electrochemical performance was enhanced when using the conductive protective layer of Example 1 compared to Comparative Example 2 using a nonconductive fabric. This is due to the fact that electrical resistance decreases compared to Comparative Example 2 using a nonconductive fabric due to conductivity.

FIG. 5 and FIG. 7 are graphs showing relative discharge capacity obtained by converting initial discharge capacity to 100. Through FIG. 5, retention of discharge capacity was identified as the cycle increased, and it was seen that capacity retention was more favorable when using the conductive fabric of Example 1 as a protective layer compared to Comparative Example 1. In other words, enhancement in the cycle performance was identified. This is due to the fact that stable solid electrolyte interphase (SEI) layers are formed locally on lithium metal since a carbon material is coated on an outermost layer by the conductive fabric enabling a reaction in the pores.

Likewise, as shown in FIG. 7, it was seen that a capacity retention property was improved when using the conductive protective layer of Example 1 compared to Comparative Example 2 using a nonconductive fabric.

REFERENCE NUMERAL

10. Thread
20. Metal Material
30. Carbon Material
100. Negative Electrode
200. Protective Layer
300. Separator
400. Positive Electrode

The invention claimed is:
1. A negative electrode for a lithium secondary battery comprising:
a lithium metal layer;
a protective layer present directly on a first surface of the lithium metal layer; and
a negative electrode current collector present on a second surface of the lithium metal layer opposite the first surface,
wherein the protective layer comprises a conductive fabric with pores formed therein, said conductive fabric comprising a thread-weaved base fabric having a metal material coating on an outer surface of the thread, and a carbon material coating on an outer surface of the metal material coating,
wherein the metal material is one or more selected from the group consisting of nickel (Ni), copper (Cu), aluminum (Al), gold (Au), silver (Ag), zinc (Zn) and tin (Sn), and
wherein the metal material is coated in 30 parts by weight to 70 parts by weight with respect to 100 parts by weight of the base fabric.
2. The negative electrode for a lithium secondary battery of claim 1, wherein the conductive fabric has a pore size of 1 μm to 10,000 μm.
3. The negative electrode for a lithium secondary battery of claim 1, wherein the conductive fabric has a porosity of 5% to 50%.
4. The negative electrode for a lithium secondary battery of claim 1, wherein the conductive fabric has a thickness of 0.01 μm to 50 μm.
5. The negative electrode for a lithium secondary battery of claim 1, wherein the conductive fabric has a sheet resistance of 0.001 ohmn/sq to 1 ohmn/sq.
6. The negative electrode for a lithium secondary battery of claim 1, wherein the thread is one or more selected from the group consisting of polyester, polyamide, polyethylene, polyurethane, polypropylene, polyurea, cotton, wool, silk and linen.
7. The negative electrode for a lithium secondary battery of claim 1, wherein the carbon material is one or more selected from the group consisting of graphite-based material; active carbon-based material; carbon black-based material; carbon nanostructure-based material; and combinations thereof.

8. The negative electrode for a lithium secondary battery of claim 1, wherein the carbon material is coated in 20 parts by weight to 50 parts by weight with respect to 100 parts by weight of the base fabric.

9. A lithium secondary battery comprising:
   a negative electrode;
   a positive electrode; and
   an electrolyte provided therebetween,
   wherein the negative electrode is the negative electrode of claim 1.

10. The negative electrode for a lithium secondary battery of claim 7,
    wherein the graphite-based material is natural graphite, artificial graphite, expanded graphite, graphene, Super-P or Super-C,
    wherein the carbon black-based material is denka black, ketjen black, channel black, furnace black, thermal black, contact black, lamp black or acetylene black, and
    wherein the carbon nanostructure-based material is carbon fiber-based, carbon nanotubes (CNT) or fullerene.

11. The negative electrode for a lithium secondary battery of claim 1, wherein the conductive fabric further comprises
    a metal material coating on an outer surface of the thread, and space between the threads is continuously coated or filled with a carbon material.

* * * * *